(12) United States Patent
Huang et al.

(10) Patent No.: US 11,321,109 B2
(45) Date of Patent: May 3, 2022

(54) CONTAINER ENGINE FOR SELECTING DRIVER BASED ON CONTAINER METADATA

(71) Applicant: HUAWEI TECHNOLOGIES CO., LTD., Guangdong (CN)

(72) Inventors: Qiang Huang, Hangzhou (CN); Wei Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 16/294,591

(22) Filed: Mar. 6, 2019

(65) Prior Publication Data

US 2019/0205156 A1 Jul. 4, 2019

Related U.S. Application Data

(63) Continuation of application No. PCT/CN2017/100351, filed on Sep. 4, 2017.

(30) Foreign Application Priority Data

Sep. 7, 2016 (CN) .......................... 201610806797.3

(51) Int. Cl.
*G06F 9/455* (2018.01)
*G06F 9/50* (2006.01)

(52) U.S. Cl.
CPC .......... *G06F 9/45558* (2013.01); *G06F 9/455* (2013.01); *G06F 9/5005* (2013.01); *G06F 9/5077* (2013.01); *G06F 2009/45587* (2013.01)

(58) Field of Classification Search
None
See application file for complete search history.

(56) References Cited

U.S. PATENT DOCUMENTS

| 6,061,753 A | 5/2000 | Ericson |
| 9,760,415 B2 | 9/2017 | Mameri et al. |

(Continued)

FOREIGN PATENT DOCUMENTS

| CN | 101916208 A | * 12/2010 |
| CN | 101916208 A | 12/2010 |

(Continued)

OTHER PUBLICATIONS

Wikipedia Contributor, "Service (systems architecture)", created on Jun. 20, 2016, [retrieved on Apr. 3, 2020], XP055673660, Retrieved from: URL:en.wikipedia.org/w/index.php?title-Service_(systems_architecture)andoldid=726153706, 2 pages.

(Continued)

*Primary Examiner* — Abu Zar Ghaffari
(74) *Attorney, Agent, or Firm* — Fish & Richardson P.C.

(57) ABSTRACT

This application discloses a container access method and apparatus. The method includes: receiving a container access request, which is used to request to access a target container; selecting a driver instance corresponding to the target container from multiple currently-running driver instances, where different driver instances in the multiple driver instances are used to drive different types of containers, and the multiple driver instances are managed by using a same program; and sending the container access request to the selected driver instance. In this solution, one program manages driver instances that are used to drive different types of containers, so that a user can access multiple containers of different types by using one program. This reduces running overheads of a program that manages multiple driver instances in a container engine.

6 Claims, 4 Drawing Sheets

(56) References Cited

U.S. PATENT DOCUMENTS

| | | | |
|---|---|---|---|
| 10,216,529 B1* | 2/2019 | Makhov | G06F 9/4411 |
| 10,326,744 B1* | 6/2019 | Nossik | H04L 9/0822 |
| 2006/0242677 A1* | 10/2006 | Kostadinovich | H04N 5/232 |
| | | | 725/105 |
| 2007/0180448 A1* | 8/2007 | Low | G06F 9/5055 |
| | | | 718/1 |
| 2009/0125902 A1* | 5/2009 | Ghosh | G06F 9/45533 |
| | | | 718/1 |
| 2010/0318657 A1 | 12/2010 | Charlson et al. | |
| 2011/0265081 A1* | 10/2011 | Lucovsky | G06F 8/60 |
| | | | 717/177 |
| 2011/0276720 A1 | 11/2011 | Ickman et al. | |
| 2012/0030672 A1* | 2/2012 | Zygmuntowicz | G06F 8/60 |
| | | | 718/1 |
| 2015/0256481 A1* | 9/2015 | Turovsky | H04L 67/10 |
| | | | 709/226 |
| 2015/0331727 A1* | 11/2015 | Mameri | G06F 9/4484 |
| | | | 719/315 |
| 2016/0162685 A1 | 6/2016 | Feroz et al. | |
| 2016/0359955 A1* | 12/2016 | Gill | H04L 67/10 |
| 2016/0380916 A1* | 12/2016 | Gnaneswaran | H04L 47/803 |
| | | | 709/224 |
| 2017/0034023 A1* | 2/2017 | Nickolov | H04L 43/0817 |
| 2017/0054759 A1* | 2/2017 | Lee | G06F 21/577 |
| 2017/0116041 A1* | 4/2017 | Nanjundaswamy | G06F 9/455 |
| 2017/0116042 A1* | 4/2017 | Xu | G06F 9/45558 |
| 2017/0171896 A1* | 6/2017 | Kreiner | H04W 76/16 |
| 2017/0214550 A1* | 7/2017 | Kumar | H04L 12/4679 |
| 2017/0257357 A1 | 9/2017 | Wang et al. | |
| 2017/0269978 A1* | 9/2017 | Engel | G06F 9/541 |
| 2017/0371693 A1* | 12/2017 | Corrie | G06F 16/188 |
| 2018/0054314 A1* | 2/2018 | Edwards | G06F 11/079 |
| 2018/0293700 A1* | 10/2018 | Tian | G06F 9/455 |

FOREIGN PATENT DOCUMENTS

| | | |
|---|---|---|
| CN | 104951360 A | 9/2015 |
| CN | 105022626 A | 11/2015 |
| CN | 105045656 A | 11/2015 |
| CN | 105099706 A | 11/2015 |
| CN | 105915378 A | 8/2016 |
| EP | 2375328 A2 | 10/2011 |
| JP | 2001051935 A | 2/2001 |
| JP | 3583931 B2 | 11/2004 |
| WO | 2015175735 A1 | 11/2015 |
| WO | 2017165151 A1 | 9/2017 |

OTHER PUBLICATIONS

Wikipedia Contributor, "Daemon (computing)", created on Aug. 6, 2014, [retrieved on Mar. 30, 2017], retrieved from: URL en.wikipedia.org/w/index.php?title=Daemon_( computi ng)andoldid= 620096311 >, 6 pages.

Office Action issued in European Application No. 17848099.2 dated Mar. 10, 2020, 5 pages.

Office Action issued in Chinese Application No. 201610806797.3 dated Dec. 2, 2019, 6 pages.

Search Report issued in Chinese Application No. 201610806797.3 dated Nov. 26, 2019, 3 pages.

Extended European Search Report issued in European Application No. 17848099.2 dated Jul. 23, 2019, 7 pages.

International Search Report dated Dec. 5, 2017 in corresponding International Patent Application No. PCT/CN2017100351 (7 pages).

Written Opinion of the International Searching Authority dated Dec. 5, 2017 in corresponding International Patent Application No. PCT/CN2017/100351 (3 pages).

Di et al., "Software Engineering Experiment," Tsinghua University Press, Jeijing Jiaotong University Press, Feb. 2008, 10 pages (partial English translation).

Office Action issued in Chinese Application No. 201610806797.3 dated Jun. 17, 2020, 7 pages.

International Search Report dated Dec. 5, 2017 in corresponding International Application No. PCT/CN2017/100351.

Office Action issued in Korean Application No. 2019-7009003 dated May 14, 2020, 8 pages (with English translation).

Office Action issued in Japanese Application No. 219-7009003 dated Oct. 12, 2020, 3 pages (with English translation).

Office Action issued in Chinese Application No. 201610806797.3 dated Oct. 20, 2020, 10 pages (with English translation).

* cited by examiner

CONTAINER ENGINE FOR SELECTING DRIVER BASED ON CONTAINER METADATA

CROSS-REFERENCE TO RELATED APPLICATIONS

This application is a continuation of International Application No. PCT/CN2017/100351, filed on Sep. 4, 2017, which claims priority to Chinese Patent 201610806797.3, filed on Sep. 7, 2016. The disclosures of the aforementioned applications are hereby incorporated by reference in their entireties.

TECHNICAL FIELD

Embodiments of this application relate to the computer field, and in particular, to a container access method and apparatus.

BACKGROUND

A container engine may be used to manage a container. A user may run multiple types of containers by using one container engine, for example, a Linux container and a container virtual machine. However, when multiple containers of different types are managed by using one container engine, driver instances used for driving different types of containers need to be managed by using different programs. In this case, running overheads of the programs that manage the driver instances used for driving the different types of containers in the container engine are increased. The following provides detailed descriptions by using a container engine Docker as an example.

The Docker is an open-source container engine and is intended to provide an automatic deployment solution of an application. On the basis of a Linux container technology, the Docker combines multiple technologies and innovations, so that an application of a container is extremely convenient and efficient. The Docker proposes concepts such as an image and an image registry, so that an application can be conveniently established, run, and moved, a surrounding ecosystem is derived, and workload and complexity during application deployment and distribution are greatly reduced. The Docker greatly promotes development of a Linux container technology, and becomes a model and an actual industry standard of Linux container technology application in recent years.

Figure 1:
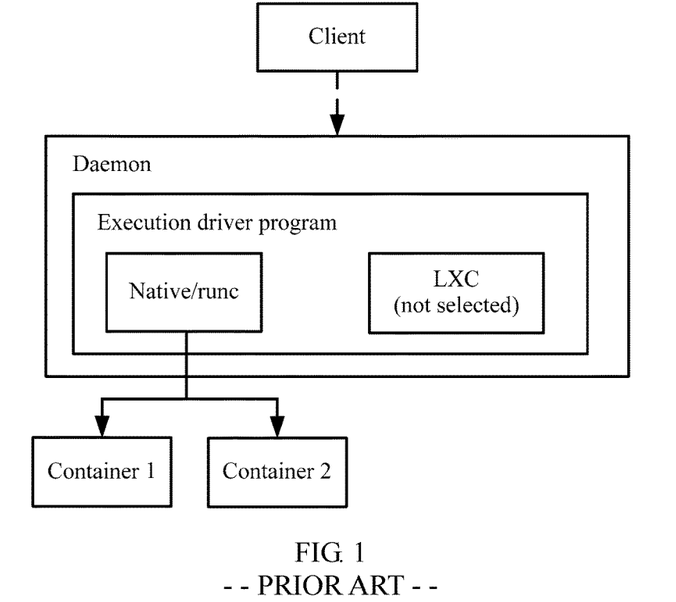
FIG. 1 shows a schematic block diagram of a Docker architecture.

FIG. 1 shows a schematic block diagram of a Docker architecture. It can be seen from the Docker architecture shown in FIG. 1 that, when a Docker daemon is started, a type of an execution driver of a container needs to be specified. That is, an execution driver needs to be selected from a native/container (Native/run container, Native/runc) driver instance (that is, a default driver instance in the Docker) and a Linux container (LXC) driver instance. Selection of the Native/runc driver instance is used as an example for description in FIG. 1. After the Native/runc driver instance is selected, the Native/runc driver instance is initialized. All containers that are subsequently run are driven by the Native/runc driver instance, and the Native/runc driver instance can drive only one type of container corresponding to the Native/runc driver instance. That is, because a Docker daemon and an execution driver are in a "strongly binding" relationship, only one type of container can be run on a Docker daemon of a host. When another type of container needs to be run, another Docker daemon needs to be run. In this case, running overheads of the Docker daemon in a Docker are increased.

SUMMARY

This application provides a container access method and apparatus, so as to reduce running overheads of a program that manages driver instances that are used to drive different types of containers in a container engine, for example, to reduce running overheads of a Docker daemon in a Docker.

According to a first aspect, a container access method is provided, including: receiving a container access request, where the container access request may be sent by, for example, a Docker client, and the container access request is used to request to access a target container; selecting a driver instance corresponding to the target container from multiple currently-running driver instances, where different driver instances in the multiple driver instances are used to drive different types of containers, the multiple driver instances are managed by using a same program, and for example, the multiple driver instances are all managed by using a Docker daemon; and sending the container access request to the driver instance corresponding to the target container.

Specifically, each of the multiple driver instances is corresponding to one driver program, and different driver programs are used to drive different types of containers.

It should be noted that this method may be performed by a router, and the router may be set in an execution driver, and is configured to schedule a container access request sent by a user.

It should be understood that, that the multiple driver instances are managed by using a same program may be that the multiple driver instances are managed by using a same daemon, and the daemon may be a background service process in an operating system, for example, the Docker daemon in a Docker.

In this solution, one program manages driver instances that are used to drive different types of containers, so that a user can access multiple containers of different types by using one program. This avoids a prior-art problem that different types of containers are accessed by using different driver instances managed by using different programs, and reduces running overheads of a program that manages multiple driver instances in a container engine.

Further, when the container engine is the Docker, in this solution, one Docker daemon may manage driver instances that are used to drive different types of containers, so that the user can access multiple containers of different types by using one Docker daemon. This avoids a prior-art problem that different types of containers are accessed by using different driver instances managed by using different Docker daemons, and reduces running overheads of the Docker daemon in a Docker system.

In addition, multiple types of containers may be accessed by using one Docker daemon and one set of Docker application programming interface (Application Programming Interface, API), so that flexibility of accessing a container by using a Docker daemon may be increased.

Optionally, the receiving a container access request further includes: receiving, by using the Docker daemon, a container access request sent by the Docker client (Client).

Specifically, when the execution driver in which the router is located and the Docker daemon are two independent processes, the router may receive the container access request by using the Docker daemon.

In this solution, the execution driver in which the router is located and the Docker daemon are decoupled into two independent processes, so as to facilitate maintenance of the execution driver and the Docker daemon during subsequent use.

With reference to the first aspect, in a possible implementation of the first aspect, the method further includes: receiving a container running request, where the container running request may be sent by, for example, the Docker client, and the container running request carries a type of the driver instance corresponding to the target container; selecting the driver instance corresponding to the target container from the multiple driver instances according to the type of the driver instance corresponding to the target container; and sending the container running request to the driver instance corresponding to the target container.

In this solution, one program manages driver instances that are used to drive different types of containers, so that a user can run multiple containers of different types by using one program. This avoids a prior-art problem that different types of containers are accessed by using different driver instances managed by using different programs, and reduces running overheads of a program that manages multiple driver instances in a container engine.

Further, when the container engine is the Docker, in this solution, one Docker daemon manages driver instances that are used to drive different types of containers, so that the user can run multiple containers of different types by using one Docker daemon. This avoids a prior-art problem that different types of containers are accessed by using different driver instances managed by using different Docker daemons, and reduces running overheads of the Docker daemon in a Docker system.

In addition, multiple types of containers may be run by using one Docker daemon and one set of Docker application programming interface (Application Programming Interface, API), so that flexibility of managing a container by using a Docker daemon is increased.

Optionally, the receiving a container access request includes: receiving the container access request, where the container access request carries a container IP of the target container; and the selecting a driver instance corresponding to the target container from multiple currently-running driver instances includes: selecting the driver instance corresponding to the target container from the multiple driver instances according to the container IP of the target container.

In this solution, the container IP of the target container is carried in the container access request, and the target container is accessed according to the container IP of the target container.

With reference to any one of the first aspect or the foregoing possible implementations, in a possible implementation of the first aspect, the receiving a container access request includes: receiving the container access request, where the container access request carries a container identifier (ID) of the target container; and the selecting a driver instance corresponding to the target container from multiple currently-running driver instances includes: selecting the driver instance corresponding to the target container from the multiple driver instances according to the container ID of the target container.

Specifically, the driver instance may determine, according to the container ID of the target container carried in the container access request, the target container accessed by using the container access request, and the driver instance sends the container access request to the target container.

In this solution, the container ID of the target container is carried in the container access request, and the target container accessed by using the container access request is determined according to the container ID, so that the user accesses the target container.

Optionally, the container access request may carry the container ID of the target container and a container type of the target container, and the driver instance corresponding to the target container may be selected from the multiple driver instances according to the container type of the target container.

Specifically, the driver instance may determine, according to the container ID, the target container that needs to be accessed by using the container access request, and the driver instance sends the container access request to the target container.

In this solution, the container access request carries the container type and the container ID of the target container, and the target container is accessed. Compared with an embodiment in which the container access request carries only the container ID of the target container, storage space used for storing a mapping relationship between a container ID and a container type is saved in the container engine (for example, the Docker).

With reference to any one of the first aspect or the foregoing possible implementations, in a possible implementation of the first aspect, the selecting the driver instance corresponding to the target container from the multiple driver instances according to the container ID of the target container includes: determining the container type of the target container according to the container ID of the target container and the mapping relationship between a container ID and a container type; and selecting the driver instance corresponding to the target container from the multiple driver instances according to the container type of the target container and a mapping relationship between a container type and a driver instance type.

In this solution, the driver instance corresponding to the target container is determined by using the mapping relationship between a container ID and a container type and the mapping relationship between a container type and a driver instance type, so that the user accesses the target container by using the driver instance corresponding to the target container.

With reference to any one of the first aspect or the foregoing possible implementations, in a possible implementation of the first aspect, the selecting the driver instance corresponding to the target container from the multiple driver instances according to the container ID of the target container includes: selecting the driver instance corresponding to the target container from the multiple driver instances according to the container ID of the target container and a mapping relationship between a container ID and a driver instance type.

In this solution, the driver instance corresponding to the target container is determined by using the mapping relationship between a container ID and a driver instance type, so that the user accesses the target container by using the driver instance corresponding to the target container.

According to a second aspect, a container access apparatus is provided, where the apparatus includes modules configured to perform the method in the first aspect.

According to a third aspect, this application provides a container access apparatus, where the apparatus includes: a memory, a processor, an input/output interface, a communications interface, and a bus system. The memory, the processor, the input/output interface, and the communications interface are connected to each other by using the bus system. The memory is configured to store an instruction.

The processor is configured to execute the instruction stored in the memory. When the instruction is executed, the processor executes the method of the first aspect by using the communications interface, and controls the input/output interface to receive input data and information and output data such as an operation result.

According to a fourth aspect, this application provides a computer readable storage medium, where the computer readable storage medium is configured to store program code of the container access method, and the program code is used to execute a method instruction in the first aspect.

In some implementations, the driver instance may be a driver sub-module in the execution driver.

In some implementations, that the multiple driver instances are managed by using a same program may include that the multiple driver instances are managed by using a same process.

DESCRIPTION OF EMBODIMENTS

The following describes technical solutions of this application with reference to accompanying drawings.

An LXC technology in a Docker architecture is a lightweight virtualization technology, and a principle of the LXC technology is to provide different system views for different running processes based on a kernel in an operating system. In such isolation, access to a hardware resource can be authorized when security and efficiency are ensured. Currently, LXCs are isolated by using a kernel namespace (namespace), that is, multiple LXCs still share one kernel actually. Compared with a conventional virtualization technology, the LXC technology has a lower loss and better performance, but has disadvantages of insufficient isolation and security. When providing a service for an application that has a relatively high security requirement, the LXC cannot meet a security requirement of the application.

Therefore, when a service is provided for an application that has a relatively high security requirement, a container virtual machine may be selected. In essence, the container virtual machine is to combine a conventional virtualization technology, such as a virtual operating system simulator (QEMU), and an application such as an image or a registry in a Docker ecosystem, so that a virtual machine can be used like an LXC. The virtual machine may provide a complete system image including a kernel for a user, and therefore can meet relatively high security requirements of some applications compared with the LXC.

Therefore, a container or a container virtual machine may be selected for different applications according to security requirements of the applications. To resolve a problem that different types of containers cannot be accessed by running one Docker daemon caused in the prior art in which only one type of driver instance can run for one Docker daemon each time, an embodiment of this application proposes an idea that different types of driver instances are managed by using a Docker daemon, so as to implement a solution in which different types of containers are accessed by running one Docker daemon.

For ease of understanding, a schematic block diagram of a Docker system architecture used in a container access method according to an embodiment of this application is first briefly described with reference to FIG. 2. A client shown in FIG. 2 may be a Docker client, a daemon may be a Docker daemon, and an execution driver program may be an execution driver. The execution driver includes different types of driver instances.

Figure 2:
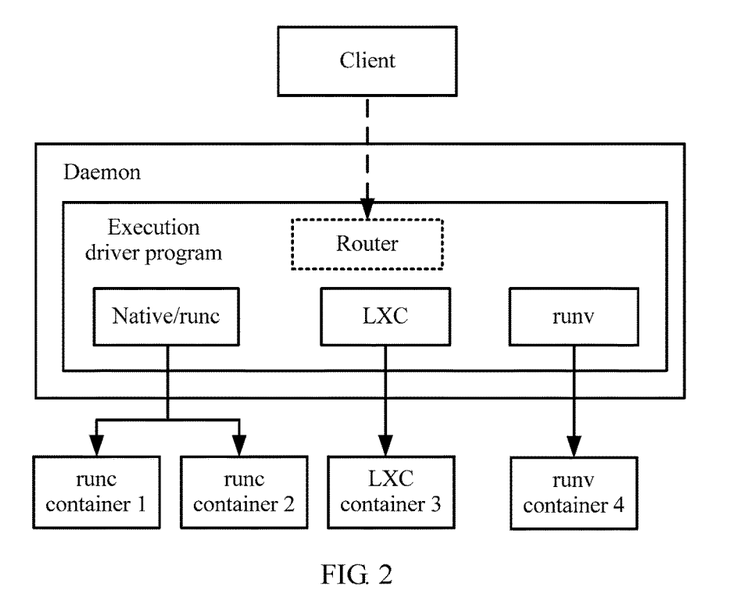
FIG. 2 shows a schematic block diagram of a Docker system architecture used in a container access method according to an embodiment of this application.

It should be understood that a Native/runc, an LXC, and a runv are merely used as specific driver instances for description in FIG. 2, and driver instances may include another type of driver instance. Another type of container may also be run and accessed in the Docker architecture shown in FIG. 2.

It should also be understood that FIG. 2 shows only modules related to this application in the Docker system architecture. The system architecture shown in FIG. 2 may further include another module in the Docker system architecture, and this is not specifically limited in this application.

It should also be understood that in the Docker architecture shown in FIG. 2, the Docker daemon, the execution driver, the driver instances, and containers may be on a physical host. Alternatively, the Docker daemon, the execution driver, the driver instances, and containers may be on a virtual machine. The Docker client and the Docker daemon may be on one physical host or virtual machine, or may be on different physical hosts or different virtual machines, and this is not specifically limited in this application.

It can be seen from the Docker architecture shown in FIG. 2 that a "strongly binding" relationship is not established between the Docker daemon and a driver instance at an execution driver layer, but the Docker daemon serves as a "manager" to manage the driver instances at the execution driver layer.

It should be noted that the Docker daemon may initialize the driver instances at the execution driver layer by using the prior art, and sequentially initialize different types of driver instances at the execution driver layer, or may initialize different types of driver instances at the execution driver layer in another manner. This is not specifically limited in this application.

A user may establish communication with the Docker daemon by using the Docker client, and send a request to the Docker daemon. The request may include a container access request, a container running request, and the like. As a main part in the Docker system architecture, the Docker daemon may first provide a function of a Docker server, receive the request sent by the Docker client, and then send the request to a running engine (Engine) in the Docker daemon. The engine may execute a series of work in the Docker, and each piece of work may exist in a form of a job, that is, the job may be considered as a most basic work execution unit in the engine.

When the engine executes a job, and when a container image is needed, the job may download an image from a Docker registry, and store the downloaded image in a form of an image (a graph) by using an image management driver (Graph driver). When a network environment needs to be established for the Docker, the job may establish and configure a network environment of a container by using a network management driver (network driver). When container running resources need to be limited or a user instruction needs to be executed, the job may complete the foregoing operation by executing an execution driver program (Execution driver).

The Docker may directly invoke a libcontainer, that is, an independent container management package, to finally operate a namespace (namespace), a control group (cgroup), a network device, a firewall rule, and the like of a container.

After the container running request is executed, an actual container is in a running state, and the container may have an independent file system, an independent and relatively secure running environment, and the like.

Figure 3:
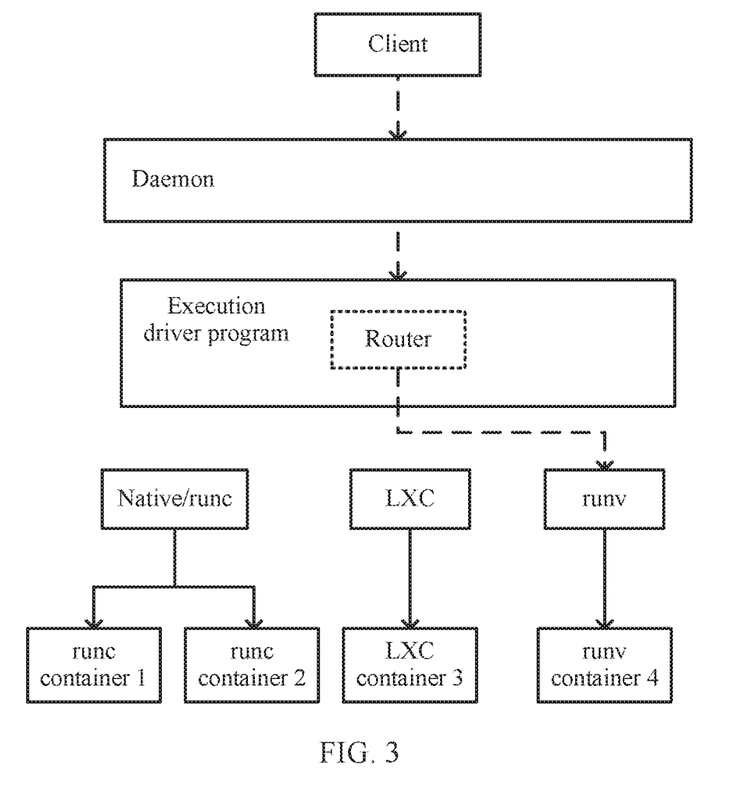
FIG. 3 shows a schematic block diagram of another Docker system architecture used in a container access method according to an embodiment of this application.

FIG. 3 shows a schematic block diagram of another Docker system architecture used in a container access method according to an embodiment of this application. It should be understood that functions of modules in the Docker architecture shown in FIG. 3 are the same as functions of the modules shown in FIG. 2, and only parts related to this application in the Docker architecture are shown. Another function module that is not shown may be the same as another module in a current Docker architecture. For brevity, reference may be made to the foregoing description, and details are not described herein again.

It can be seen from the Docker architecture shown in FIG. 3 that an execution driver program (execution driver) layer may be independent of a daemon, and specific driver instances (for example, Native/runc shown in FIG. 3, a built-in driver instance of a container; an LXC, a driver instance of an LXC container; runv, a driver instance of a container virtual machine) may be independent of the execution driver layer. It should be noted that independent existence may mean that two processes are mutually independent.

It should be understood that the architectures shown in FIG. 2 and FIG. 3 may further be transformed. For example, a daemon and an execution driver program may be two independent processes, but a specific driver instance may be used as a segment of logic in the execution driver program process, that is, the specific driver instance is no longer independent of the execution driver layer. The Docker architectures shown in FIG. 2 and FIG. 3 are not specifically limited in this application.

Figure 4:
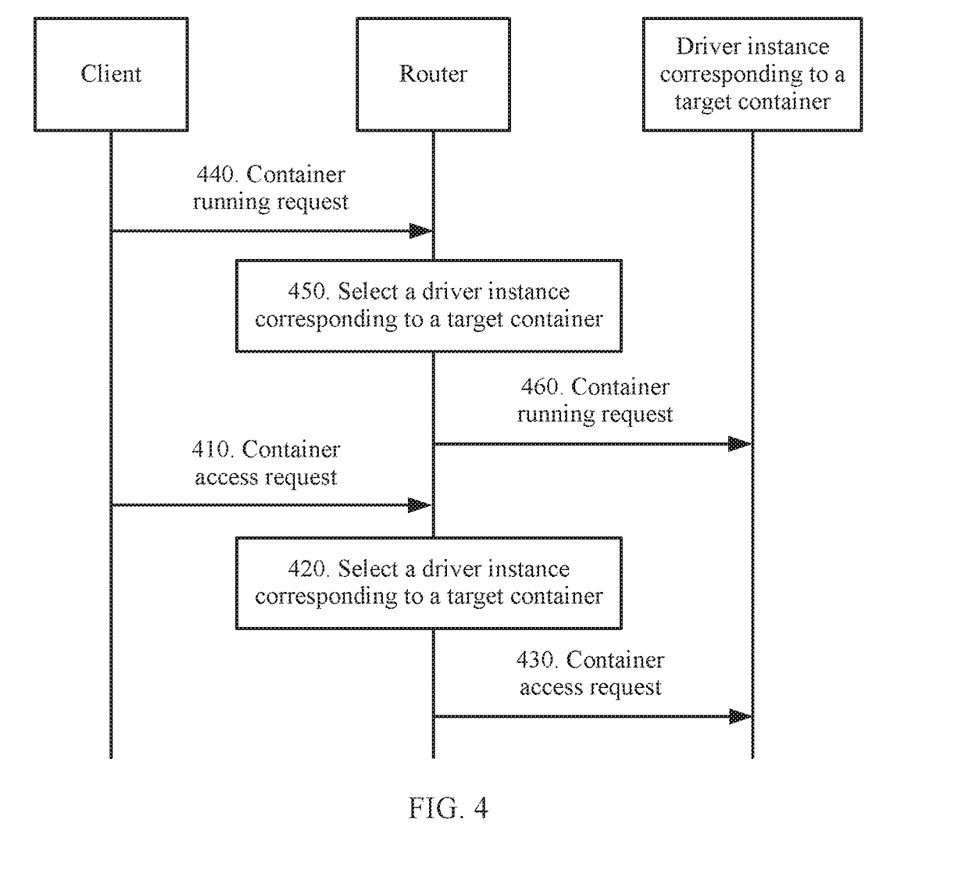
FIG. 4 shows a schematic flowchart of a container access method according to an embodiment of this application.

FIG. 4 shows a schematic flowchart of a container access method according to an embodiment of this application. The method shown in FIG. 4 may be performed by a router in FIG. 2 or FIG. 3. It should be understood that FIG. 4 shows detailed steps or operations of the container access method, but these steps or operations are merely examples. Another operation or transformation of the operations in FIG. 4 may be executed in this embodiment of this application. In addition, steps in FIG. 4 may be performed according to an order different from that shown in FIG. 4, and not all operations in FIG. 4 may be performed. The following describes in detail the steps in the method shown in FIG. 4.

410. A client sends a container access request to the router, where the container access request is used to request to access a target container.

Specifically, the router is configured to schedule a request sent by a user, where the request may include the container access request and/or a container running request.

It should be understood that the container access request may carry a container ID of the target container or a container IP of the target container that is used by the router to determine the target container accessed by using the container access request.

It should be also understood that the client may be a Docker client, and the Docker client and a Docker daemon may be on one physical host or virtual machine, or may be on different physical hosts or different virtual machines. This is not specifically limited in this application.

It should be noted that the router may be a segment of logic in an execution driver, and the execution driver may be a segment of logic in the Docker daemon. Alternatively, the execution driver and the Docker daemon may be two different processes.

420. The router selects a driver instance corresponding to the target container from multiple currently-running driver instances, where different driver instances in the multiple driver instances are used to drive different types of containers, and the multiple driver instances are managed by using a same Docker daemon Daemon.

Specifically, each of the multiple driver instances is corresponding to one driver program, and different driver programs are used to drive different types of containers.

The multiple driver instances are managed by using a same Docker Daemon, and during startup, the Docker Daemon may initialize each of the multiple driver instances.

430. The router sends the container access request to the driver instance corresponding to the target container.

Specifically, the router may access the target container by using the driver instance corresponding to the target container.

In this solution, one Docker daemon may manage driver instances that are used to drive different types of containers, so that a user can access multiple containers of different types by using one Docker daemon. That is, a mode in which the Docker daemon is in a "strongly binding" relationship with a specific driver instance in the execution driver changes to a mode in which the Docker daemon manages multiple specific driver instances in the execution driver. This avoids a prior-art problem that different types of containers are accessed by using different driver instances managed by using different Docker daemons, and reduces running overheads of the Docker daemon in a Docker system.

In addition, multiple types of containers may be accessed by using one Docker daemon and one set of Docker application programming interface (API), so that flexibility of accessing a container by using a Docker daemon may be increased.

Optionally, in an embodiment, in step 410, the container access request is received, where the container access request carries the container ID of the target container. In step 420, the driver instance corresponding to the target container is selected from the multiple driver instances according to the container ID of the target container.

Specifically, the receiving the container access request may be: receiving, by the router, a container access request sent by the Docker client, where the container access request may carry the container ID of the target container. The router may obtain, according to the container ID, information related to the target container, for example, a container type of the target container. The router may select the driver instance corresponding to the target container from the multiple driver instances of different types at an execution driver layer according to the obtained container type of the target container.

It should be understood that there are multiple specific implementations of selecting the driver instance corresponding to the target container from the multiple driver instances according to the container ID of the target container. For example, the router may directly determine the driver instance corresponding to the target container according to the container ID of the target container by using a pre-established mapping relationship between a container ID and a driver instance; alternatively, the router may determine the driver instance corresponding to the target container according to the container ID of the target container by using a pre-established mapping relationship between a container ID and a driver instance. A manner of selecting the driver instance corresponding to the target container is not specifically limited in this application.

Optionally, in an embodiment, the selecting the driver instance corresponding to the target container from the multiple driver instances according to the container ID of the target container includes: determining the container type of the target container according to the container ID of the target container and a mapping relationship between a container ID and a container type; and selecting the driver instance corresponding to the target container from the multiple driver instances according to the container type of the target container and a mapping relationship between a container type and a driver instance type.

It should be noted that a field may be added to container information maintained by the Docker daemon, and the field may be used to record the mapping relationship between a container ID and a container type and/or the mapping relationship between a container type and a driver instance type.

It should be understood that the mapping relationship between a container ID and a container type and/or the mapping relationship between a container type and a driver instance type may be pre-established during initialization of the Docker daemon. This is not specifically limited in this application.

Optionally, in an embodiment, the selecting the driver instance corresponding to the target container from the multiple driver instances according to the container ID of the target container includes: selecting the driver instance corresponding to the target container from the multiple driver instances according to the container ID of the target container and the mapping relationship between a container ID and a driver instance type.

It should be noted that a field may be added to container information maintained by the Docker daemon, and the field may be used to record the mapping relationship between a container ID and a driver instance type.

It should be understood that the mapping relationship between a container ID and a driver instance type may be pre-established during initialization of the Docker daemon. This is not specifically limited in this application.

Optionally, in an embodiment, the method further includes: step 440 to step 450.

440. Receive a container running request, where the container running request carries a type of the driver instance corresponding to the target container.

Specifically, the receiving the container running request may be: receiving, by the router, a container running request sent by the Docker client.

The container running request carries the type of the driver instance corresponding to the target container, that is, the container running request may represent running a container.

For example, the container running request may carry a parameter "-exec-driver=runv", and the container running request may be used to indicate that a runv container needs to be run by using a driver instance runv.

450. The router determines the driver instance corresponding to the target container from the multiple driver instances according to the type of the driver instance corresponding to the target container.

For example, the Docker client sends the container running request to the router. That is, the container running request enters the router at the execution driver layer, and the router may analyze the container running request and determine a parameter "exec-driver" in the container running request, that is, determine the type of the driver instance specified in the container running request.

It should be noted that the multiple currently-running driver instances may be initialized in an initialization process of the Docker daemon or after the Docker daemon is run. When the container running/access request sent by the Docker client is received, and after the type of the target container that needs to be run is determined, a type of a driver instance that needs to be initialized is determined according to the type of the target container, and the driver instance corresponding to the type of the driver instance is initialized.

In this embodiment of this application, the added step of analyzing the container running request does not change original usage of an interface and another parameter in the Docker architecture.

460. The router sends the container running request to the driver instance corresponding to the target container.

Specifically, the router may run the target container by using the driver instance corresponding to the target container.

In this solution, one program manages driver instances that are used to drive different types of containers, so that a user can run multiple containers of different types by using one program. That is, a mode in which the Docker daemon is in a "strongly binding" relationship with a specific driver instance in the execution driver changes to a mode in which the Docker daemon manages multiple specific driver instances in the execution driver. This avoids a prior-art problem that different types of containers are accessed by using different driver instances managed by using different programs, and reduces running overheads of a program that manages multiple driver instances in a container engine.

In addition, multiple types of containers may be run by using one Docker daemon and one set of Docker application programming interface (Application Programming Interface, API), so that flexibility of managing a container by using a Docker daemon is increased.

Figure 5:
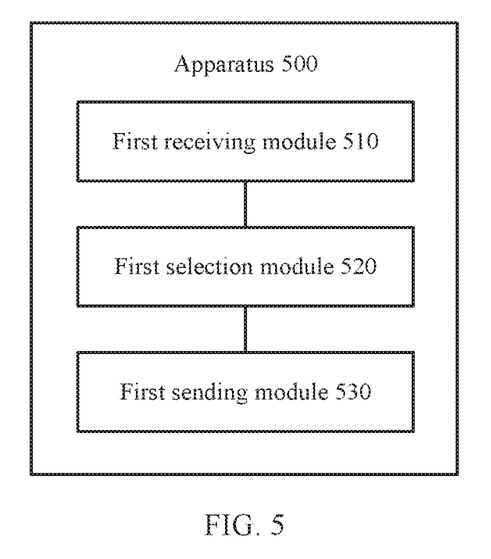
FIG. 5 shows a schematic block diagram of a container access apparatus according to an embodiment of this application.

FIG. 5 shows a schematic block diagram of a container access apparatus according to an embodiment of this application. The apparatus 500 shown in FIG. 5 includes: a first receiving module 510, a first selection module 520, and a first sending module 530.

The first receiving module 510 is configured to receive a container access request, where the container access request is used to request to access a target container.

The first selection module 520 is configured to select a driver instance corresponding to the target container from multiple currently-running driver instances, where different driver instances in the multiple driver instances are used to drive different types of containers, and the multiple driver instances are managed by using a same program.

The first sending module 530 is configured to send the container access request to the driver instance that is corresponding to the target container and selected by the first selection module.

In this solution, one program manages driver instances that are used to drive different types of containers, so that a user can access multiple containers of different types by using one program. This avoids a prior-art problem that different types of containers are accessed by using different driver instances managed by using different programs, and reduces running overheads of a program that manages multiple driver instances in a container engine.

Further, when the container engine is a Docker, that multiple driver instances are managed by using a same program may be that multiple driver instances are managed by using a same Docker daemon. In this solution, one Docker daemon manages driver instances that are used to drive different types of containers, so that the user can access multiple containers of different types by using one Docker daemon. This avoids a prior-art problem that different types of containers are accessed by using different driver instances managed by using different Docker daemons, and reduces running overheads of the Docker daemon in a Docker system.

In addition, multiple types of containers may be accessed by using one Docker daemon and one set of Docker application programming interface (Application Programming Interface, API), so that flexibility of accessing a container by using a Docker daemon may be increased.

Optionally, in an embodiment, the apparatus 500 further includes: a second receiving module, configured to receive a container running request, where the container running request carries a type of the driver instance corresponding to the target container; a second selection module, configured to select the driver instance corresponding to the target container from the multiple driver instances according to the type of the driver instance corresponding to the target container; and a second sending module, configured to send the container running request to the driver instance corresponding to the target container.

Optionally, in an embodiment, the first receiving module is specifically configured to receive the container access request, where the container access request carries a container ID of the target container; and the first selection module is specifically configured to select the driver instance corresponding to the target container from the multiple driver instances according to the container ID of the target container.

Optionally, in an embodiment, the first selection module is specifically further configured to: determine a container type of the target container according to the container ID of the target container and a mapping relationship between a container ID and a container type; and select the driver instance corresponding to the target container from the multiple driver instances according to the container type of the target container and a mapping relationship between a container type and a driver instance type.

Optionally, in an embodiment, the first selection module is specifically further configured to select the driver instance corresponding to the target container from the multiple driver instances according to the container ID of the target container and a mapping relationship between a container ID and a driver instance type.

Figure 6:
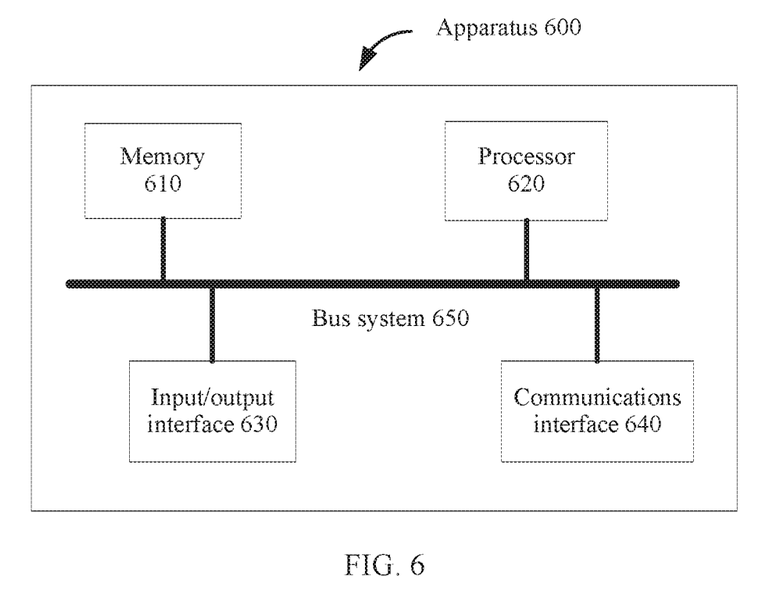
FIG. 6 shows a schematic block diagram of a container access apparatus according to another embodiment of this application.

FIG. 6 shows a schematic block diagram of a container access apparatus according to another embodiment of this application. The apparatus 600 shown in FIG. 6 includes: a memory 610, a processor 620, an input/output interface 630, a communications interface 640, and a bus system 650. The memory 610, the processor 620, the input/output interface 630, and the communications interface 640 are connected to each other by using the bus system 650. The memory 610 is configured to store an instruction. The processor 620 is configured to execute the instruction stored in the memory 610, so as to control the input/output interface 630 to receive input data and information and output data such as an operation result, and control the communications interface 640 to send a signal.

The input/output interface 630 is configured to receive a container access request, where the container access request is used to request to access a target container.

The processor 620 is configured to select a driver instance corresponding to the target container from multiple currently-running driver instances, where different driver instances in the multiple driver instances are used to drive different types of containers, and the multiple driver instances are managed by using a same program.

The input/output interface 630 is configured to send the container access request to the driver instance corresponding to the target container.

It should be understood that in this embodiment of this application, the processor 620 may be a general central processing unit (CPU), a microprocessor, an application-specific integrated circuit (ASIC), or one or more integrated circuits, and is configured to execute a related program, so as to implement technical solutions provided in the embodiments of this application.

It should be also understood that the communications interface 640 uses a transceiver apparatus that may be but is not limited to a transceiver, so as to implement communication between the mobile terminal 600 and another device or communications network.

The memory 610 may include a read-only memory and a random access memory, and provides an instruction and data to the processor 620. A part of the memory 610 may further include a non-volatile random access memory. For example, memory 610 may further store information about a device type.

In addition to a data bus, the bus system 650 may include a power bus, a control bus, a status signal bus, and the like. However, for clear description, various types of buses in the figure are marked as the bus system 650.

In an implementation process, the steps in the foregoing method may be completed by means of an integrated logic circuit of hardware in the processor 620 or an instruction in a software form. The steps of the container access method disclosed with reference to the embodiments of this application may be directly performed by a hardware processor, or may be performed by using a combination of a hardware module and a software module in the processor. The software module may be located in a mature storage medium in the field, such as a random access memory, a flash memory, a read-only memory, a programmable read-only memory, an electrically-erasable programmable memory, or a register. The storage medium is located in the memory 610. The processor 620 reads information in the memory 610, and completes the steps of the foregoing method in combination with hardware of the processor 620. To avoid repetition, details are not described herein again.

In this solution, one program manages driver instances that are used to drive different types of containers, so that a user can access multiple containers of different types by using one program. This avoids a prior-art problem that different types of containers are accessed by using different driver instances managed by using different programs, and reduces running overheads of a program that manages multiple driver instances in a container engine.

Further, when the container engine is a Docker, that multiple driver instances are managed by using a same program may be that multiple driver instances are managed by using a same Docker daemon. In this solution, one Docker daemon manages driver instances that are used to drive different types of containers, so that the user can access multiple containers of different types by using one Docker daemon. This avoids a prior-art problem that different types of containers are accessed by using different driver instances managed by using different Docker daemons, and reduces running overheads of the Docker daemon in a Docker system.

In addition, multiple types of containers may be accessed by using one Docker daemon and one set of Docker application programming interface (Application Programming Interface, API), so that flexibility of accessing a container by using a Docker daemon may be increased.

It should be understood that in the embodiments of this application, "B corresponding to A" indicates that B is associated with A, and B may be determined according to A. However, it should further be understood that determining A according to B does not mean that B is determined according to A only; that is, B may also be determined according to A and/or other information.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by means of software, hardware, firmware, or any combination thereof. When software is used to implement the embodiments, the embodiments may be implemented partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (Digital Video Disc, DVD)), a semiconductor medium (for example, a solid state disk (Solid State Disk, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of container access, comprising:
   receiving, by a router in a Docker system and from a Docker client in the Docker system, a container access request requesting access to a target container, wherein the container access request carries a container identifier (ID) of the target container;
   selecting, by the router, a driver instance corresponding to the target container from multiple currently running driver instances according to the container ID of the target container and a mapping relationship between a container ID and a driver instance type, wherein different driver instances in the multiple driver instances drive different types of containers, wherein the multiple driver instances are managed by using a same Docker Daemon in the Docker system, wherein an execution driver in which the router is located is independent of the Docker Daemon, and wherein the multiple driver instances are included in the execution driver or are independent of the execution driver; and
   sending, by the router, the container access request to the driver instance corresponding to the target container.

2. The method according to claim 1, wherein the method further comprises:
   receiving a container running request comprising a type of the driver instance corresponding to the target container;
   selecting the driver instance corresponding to the target container from the multiple driver instances according to the type of the driver instance corresponding to the target container; and
   sending the container running request to the driver instance corresponding to the target container.

3. A computer system, comprising:

at least one processor; and one or more memories coupled to the at least one processor and storing programming instructions for execution by the at least one processor to perform:

receiving, by a router in a Docker system and from a Docker client in the Docker system, a container access request requesting access to a target container, wherein the container access request carries a container identifier (ID) of the target container;

selecting, by the router, a driver instance corresponding to the target container from multiple currently running driver instances according to the container ID of the target container and a mapping relationship between a container ID and a driver instance type, wherein different driver instances in the multiple driver instances drive different types of containers, wherein the multiple driver instances are managed by using a same Docker Daemon in the Docker system, wherein an execution driver in which the router is located is independent of the Docker Daemon, and wherein the multiple driver instances are included in the execution driver or are independent of the execution driver; and sending, by the router, the container access request to the driver instance corresponding to the target container.

4. The computer system according to claim 3, wherein the programming instructions are for execution by the at least one processor to further perform:

receiving a container running request comprising a type of the driver instance corresponding to the target container;

selecting the driver instance corresponding to the target container from the multiple driver instances according to the type of the driver instance corresponding to the target container; and sending the container running request to the driver instance corresponding to the target container.

5. A non-transitory storage medium, comprising computer-readable instructions when executed by one or more processors cause the one or more processors to implement:

receiving, by a router in a Docker system and from a Docker client in the Docker system, a container access request, wherein the container access request requests access to a target container, wherein the container access request carries a container identifier (ID) of the target container;

selecting, by the router, a driver instance corresponding to the target container from multiple currently running driver instances according to the container ID of the target container and a mapping relationship between a container ID and a driver instance type, wherein different driver instances in the multiple driver instances drive different types of containers, wherein the multiple driver instances are managed by using a same Docker Daemon in the Docker system, wherein an execution driver in which the router is located is independent of the Docker Daemon, and wherein the multiple driver instances are included in the execution driver or are independent of the execution driver; and sending, by the router, the container access request to the driver instance corresponding to the target container.

6. The non-transitory storage medium according to claim 5, wherein the instructions further cause the one or more processors to implement:

receiving a container running request comprising a type of the driver instance corresponding to the target container;

selecting the driver instance corresponding to the target container from the multiple driver instances according to the type of the driver instance corresponding to the target container; and sending the container running request to the driver instance corresponding to the target container.

* * * * *